United States Patent [19]

Hirano

[11] Patent Number: 5,066,102
[45] Date of Patent: Nov. 19, 1991

[54] COMBINER FOR HEAD-UP DISPLAY AND GLASS WITH DURABLE REFLECTIVE COATING

[75] Inventor: Akira Hirano, Yokohama, Japan

[73] Assignee: Asahi Glass Company, Ltd., Tokyo, Japan

[21] Appl. No.: 594,630

[22] Filed: Oct. 9, 1990

[30] Foreign Application Priority Data

Oct. 9, 1989 [JP] Japan .............................. 1-117962[U]
Dec. 26, 1989 [JP] Japan .................................. 1-334857

[51] Int. Cl.$^5$ .......................... G02B 27/14; G02B 5/26; G02B 1/10
[52] U.S. Cl. .................................. 359/630; 428/428; 428/432; 428/701
[58] Field of Search ............... 350/174, 166, 600, 601; 428/428, 432, 701

[56] References Cited

U.S. PATENT DOCUMENTS

| | | | |
|---|---|---|---|
| 2,852,974 | 9/1958 | Nobles | 350/174 |
| 3,276,813 | 7/1964 | Shaw | 350/174 |
| 3,848,974 | 11/1974 | Hosking et al. | 350/174 |
| 3,887,273 | 6/1975 | Griffiths | 350/174 |
| 4,961,625 | 10/1990 | Wood et al. | 350/174 |

*Primary Examiner*—Jon W. Henry
*Attorney, Agent, or Firm*—Oblon, Spivak, McClelland, Maier & Neustadt

[57] ABSTRACT

Disclosed herein is a combiner for head-up display, wherein a combiner part having a transparent, reflective coating formed thereon is provided in one part of the surface of a windshield glass, the combiner part having non-selecting reflection property.

Also disclosed is a glass with reflective coating of excellent durability, wherein at least one surface of the glass is covered with a reflective coating made up of a composite oxide of Ti, Ta and Si, as the principal component.

10 Claims, 6 Drawing Sheets

COMBINER FOR HEAD-UP DISPLAY AND GLASS WITH DURABLE REFLECTIVE COATING

This invention relates to a combiner for head-up display (HUD), and more particularly, it is concerned with a combiner with a reflective coating and being excellent in its durability.

In general, various measuring instruments are installed in the instrument panel of cars and vehicles. Besides these ordinary measuring instruments, there has already been known to provide a head-up display (HUD) device which is so constructed that a light-reflective combiner part is provided within the front viewing field of the windshield at the driver's seat, and that a display image to be emitted from a source of display is projected onto this combiner part so as to limit a moving range of the driver's field to the minimum.

For example, there has been known the head-up display device of a type, wherein a light reflective coating 1 is formed on one part of the windshield glass 2 as shown in FIG. 1(a) of the accompanying drawing, and a light A from the source of display is caused to reflect at this light reflective coating 1 so as to be visible from a driver's viewing point B as a display image C on the outer front side of the windshield glass 2.

Thus, while a combiner 3 provided with a combiner part with the reflective coating 1 being formed on the windshield glass 2 has been known, there has been used, as the light reflective coating 1, a selectively reflective coating made up of a single layer film or multi-layered film for an improved light reflectance in a certain particular wavelength, and having the maximum reflection peak in a particular wavelength. However, when this selectively reflective coating is used as the combiner, there is an apprehension such that the outer appearance of the vehicle will be spoiled due to difference in the color between the portion with such selectively reflective coating being formed and the portion without the reflective film being formed thereon. Therefore, when the polychromatic display of two or more colors is envisaged, there would be various disadvantages such that the reflection efficiency lowers inversely, or reproducibility of the color of light from the light source and the color of light visible to the driver become unfavorably poor. Also, since a rigid control is demanded on the film thickness, the production steps become complicated to readily invite increase in the production cost. In addition to this, the overall film thickness is also increased with the consequent difficulty in obtaining sufficient mechanical durability of the film.

It is therefore an object of the present invention to solve these disadvantages inherent in the conventional techniques as mentioned in the foregoing.

With a view to attaining the above-mentioned object, the present invention provides a combiner for head-up display, wherein a combiner part having a transparent reflective coating formed thereon is provided in one part of the surface of a windshield glass, the combiner part having non-selective reflection property.

Preferred ways of carrying out the invention will be described in detail hereinbelow with reference to the accompanying drawing which illustrate the preferred embodiments thereof, in which.

Figure 5:
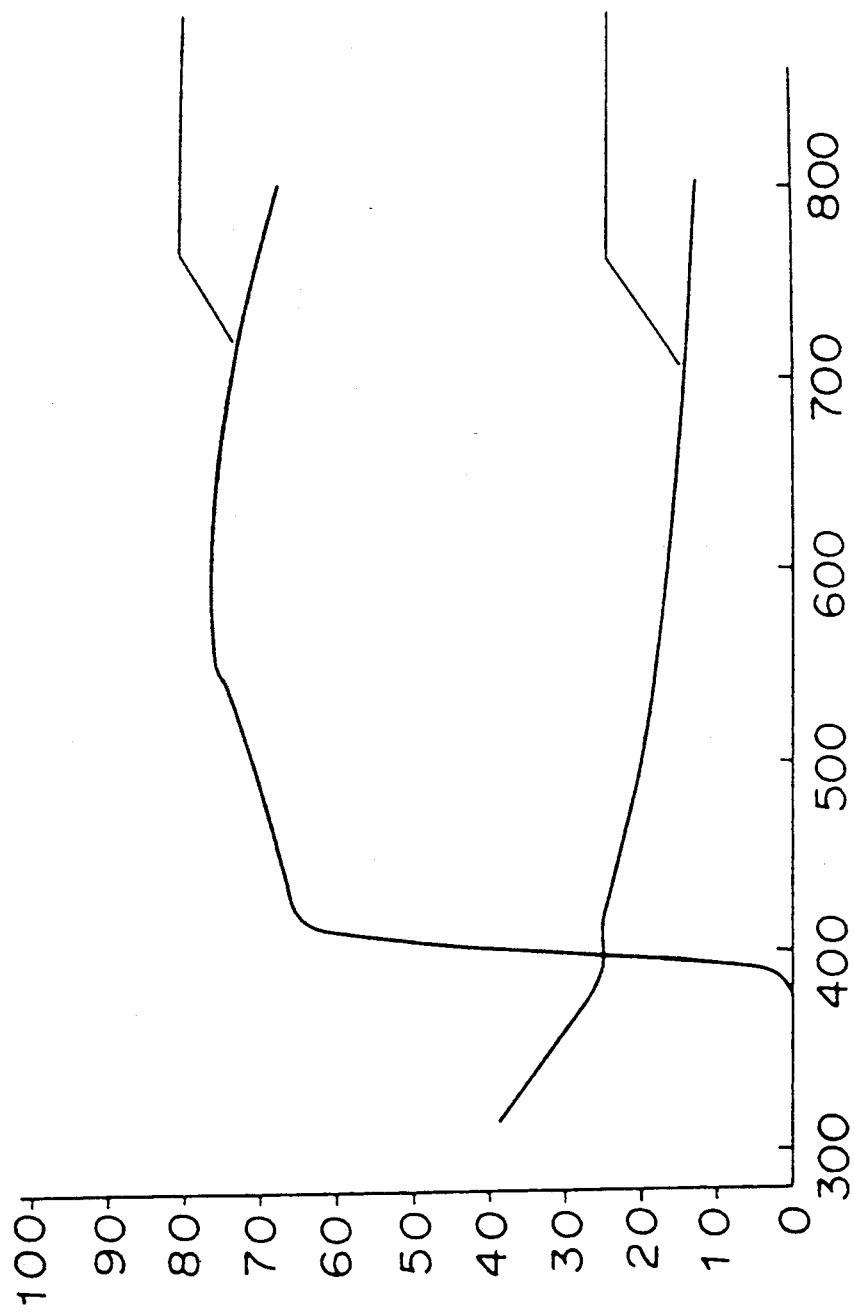
Figure 6:
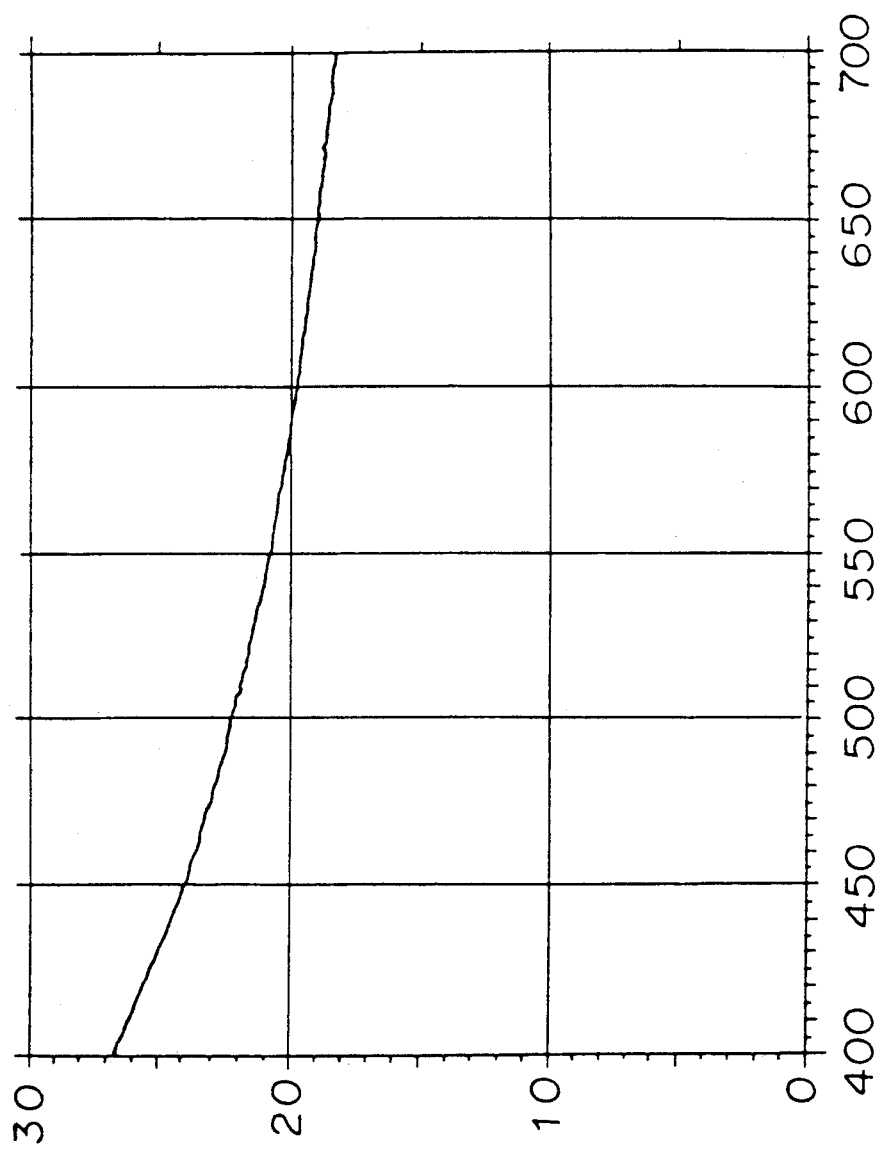

FIG. 5 is a graphical representation showing the spectra at the part of the reflective coating of the combiner for HUD in Example 3 of the present invention; and FIG. 6 is a graphical representation showing the / reflecting characteristic of the film surface with an incident angle of light of 65 degrees at the portion of the reflective coating for the HUD combiner according to Example 3 of the present invention.

Figure 1A:
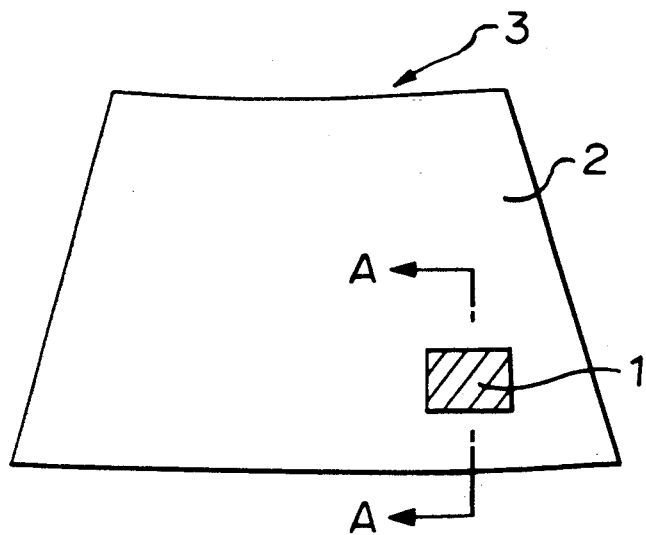
FIG. 1(a) is a plan view showing one example of the combiner according to the present invention.
Figure 1B:
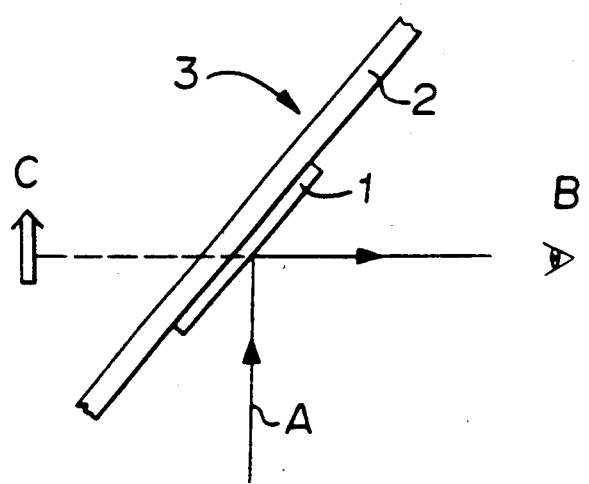
FIG. 1(b) is a cross-sectional view, taken along the line A—A in FIG. 1(a)

Referring now to FIG. 1(a) showing the plan view of one embodiment of the combiner for HUD according to the present invention, and FIG. 1(b) showing a cross-section of the combiner in FIG. 1(a), taken along the line A—A, the HUD combiner 3 is constructed with the windshield glass 2, and the transparent increased reflective film 1 having the non-selective reflection property, which is formed at a predetermined portion on the surface of the windshield glass 2. In order for this increased reflective film 1 to exhibit its function as the increased reflective film, it should preferably be made of a substance having a higher refractive index than the windshield glass 2. It is particularly preferred that this refractive index be in a range of from about 1.8 to 2.3. When the refractive index exceeds 2.3, the end part of the film becomes conspicuous. On the contrary, when the refractive index is below 1.8, desired reflectance is difficult to be obtained, even if the film thickness is increased. Also, since the reflective film is required to have high light transmittance, it should preferably be made up of a transparent metal oxide. While there is no particular limitation to the kind of the transparent metal oxide, it may be selected from simple oxides such as $TiO_2$ (refractive index n=approx. 2.2 to 2.3), $ZrO_2$ (n=approx. 2.0 to 2.1), $Ta_2O_5$ (n=approx. 2.0 to 2.1), $SnO_2$ (n=approx. 1.9 to 2.0), and so forth; or composite oxides such as $TiO_2$-$SiO_2$, $ZrO_2$-$SiO_2$, $TiO_2$-$ZrO_2$, $In_2O_3$-$SnO_2$ (n=approx. 1.9), and so on.

In order for this reflective coating to increase its surface reflectance and not to render conspicuous the difference in its color in comparison with the other portions where no reflective coating 1 is formed, the coating 1 should desirably have its thickness in a range of from 400 to 2,300 Å, or preferably from 400 to 1,500 Å, or most preferably from 700 to 1,200 Å, in terms of the optical film thickness (a product of the refractive index n and the actual film thickness d). Within this range of the optical film thickness, variations in the actual film thickness do not become so remarkable, hence a favorable outer appearance and also good productivity can be attained. When the optical film thickness is in a range of from 400 to 1,500 Å, a particularly neutral color can be readily obtained in its outer appearance, which is favorable for the quality of the product.

Figure 2:
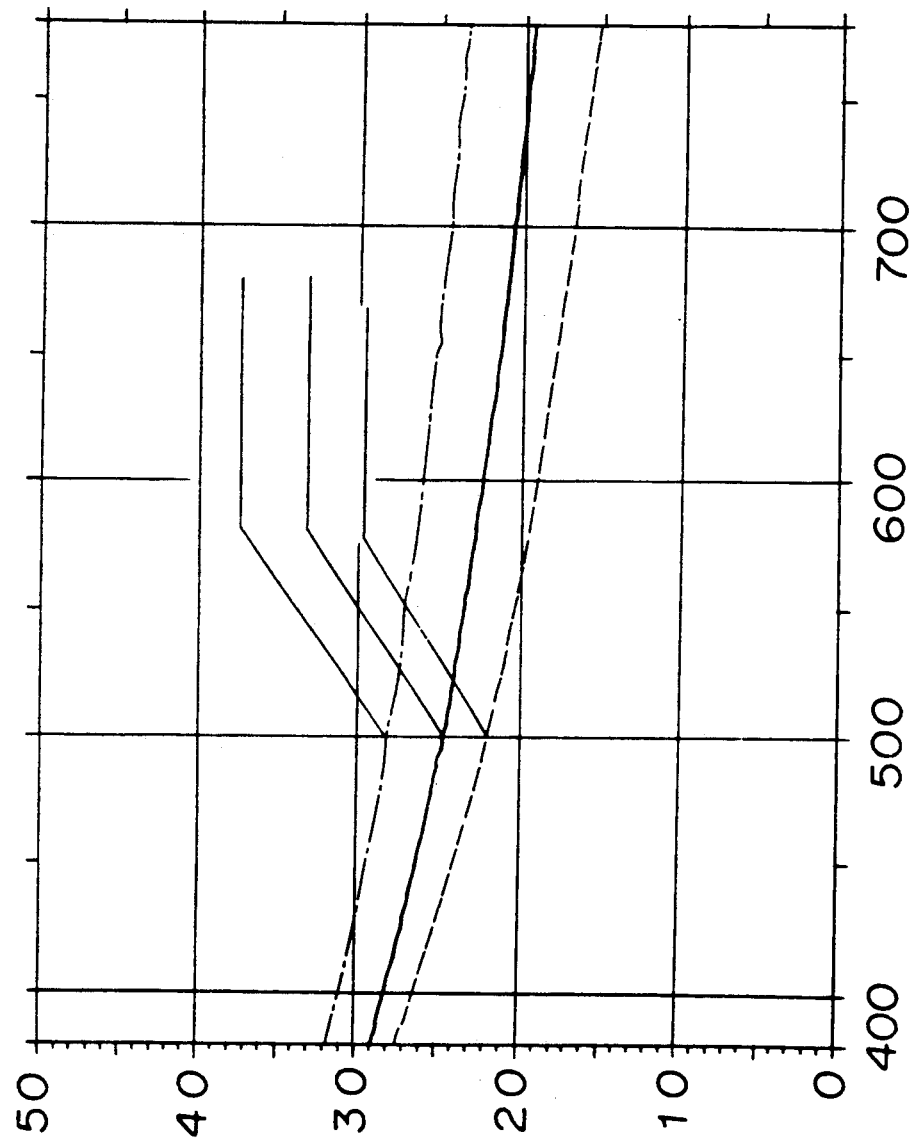
FIG. 2 is a graphical representation showing the reflection characteristics at the surface of the reflective coating in Example 1 at the respective incident light angles of 60, 65, and 70 degrees.
Figure 3:
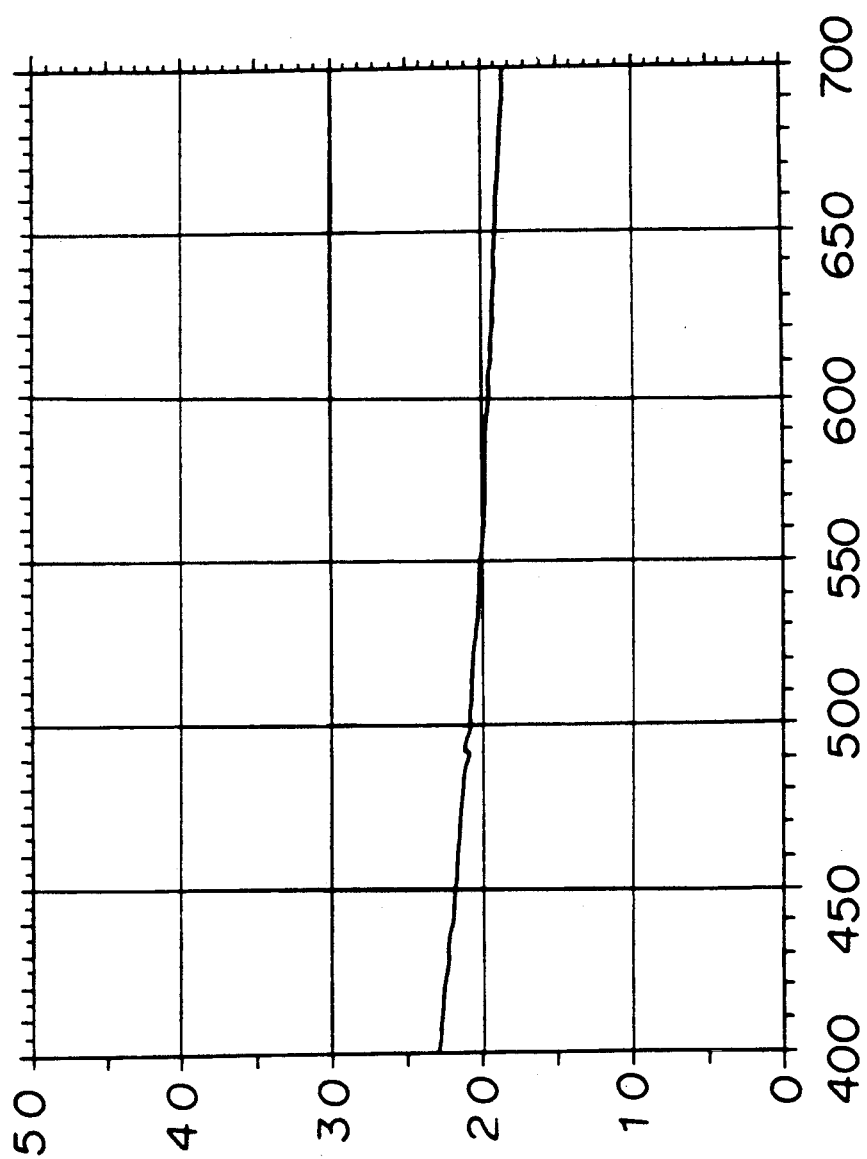
FIG. 3 is a graphical representation showing the reflection characteristics at the surface of the reflective coating in Example 2 at the incident light angle of 65 degree.

As already mentioned in the foregoing, the reflective coating 1 of the present invention is a transparent film having non-selective reflection property. By the term "non-selective reflection property" as used in the present invention is meant by that a difference ($\Delta R$) between the maximum reflectance ($R_{max}$) with the incident light angle of zero degree and the minimum reflectance ($R_{min}$) with the incident light angle of zero degree, at the surface of the reflective coating in the combiner part, on which such coating has been formed, is represented as $\Delta R = R_{max} - R_{min} \leq 5$ (%), in an arbitrary wavelength range of 100 nm within the visible light region (450 to 700 nm). As the consequence, no remarkable reflection peak can be seen in any particular wavelength in the visible light region, but the reflection characteristics will become as shown in FIGS. 2 and 3. In this case, the visible light reflectance (with incident angle of approximately zero degree) should preferably be in a range of from 9 to 18%. When the visible light reflectance is below 9%, there is apprehension such that an image to be projected becomes unable to be seen clearly. On the contrary, when the visible light reflectance exceeds 18%, the visible light transmittance (Tv) or 70% or higher, which is required to be the transmittance of the windshield glass becomes unable to be obtained. (By the way, throughout this specification, the terms "visible light reflectance" and "visible light transmittance" are respectively meant by the visible light reflectance and the visible light transmittance as defined by JIS R-3106.) Also, throughout this invention, the term "neutral" with respect to the color is meant by the following characteristics: that is to say, provided that the difference in the coordinate x and the coordinate y for the combiner portion having the reflective coating 1 formed thereon and the portion of the glass 2 without reflective coating 1 is denoted by $\Delta x$ and $\Delta y$, respectively, when the color is indicated by the CIE color system, the light transmitting color has a relationship of $\Delta x \leq 0.01$ and $\Delta y \leq 0.01$, while the light reflecting color has a relationship of $\Delta x \leq 0.03$ and $\Delta y \leq 0.03$.

There is no particular limitation to the process for manufacturing the reflective coating 1, and any conventional methods may be employed arbitrarily, such as the vacuum-evaporation method, the sputtering method, the ion-plating method, and other vacuum film-forming methods. Besides these, the sol-gel methods such as the immersing method, the printing method, etc. can also be used. Of various sol-gel methods, the dip-coating method, the spraying method, the transfer printing method, screen-printing method, and so forth can be effected at a low operating cost from the industrial standpoint. In particular, the screen-printing method is the most promising for the purpose of the industrialized mass-production, although this method has its own disadvantage such that the printing material contains a large amount of organic components, which renders the resulted film to be porous in quality in comparison with the vacuum film forming methods or other sol-gel methods, hence the film as formed would apprehensively liable to be inferior in its chemical durability such as chemicals resistant property.

More particularly, the film composed of the oxide of titanium or the composite oxide of Ti-Si to be obtained by the screen-printing is in some case not so suitable for use in its exposed condition, since it has been found out as the result of the chemicals-resistance test that deterioration, dissolution, etc. of the film proceeded. It is therefore preferred that use be made of a film which contains therein the composite oxide of Ti, Ta and Si as the principal component, as the reflective coating 1, particularly as the reflective coating of excellent durability.

Figure 4:
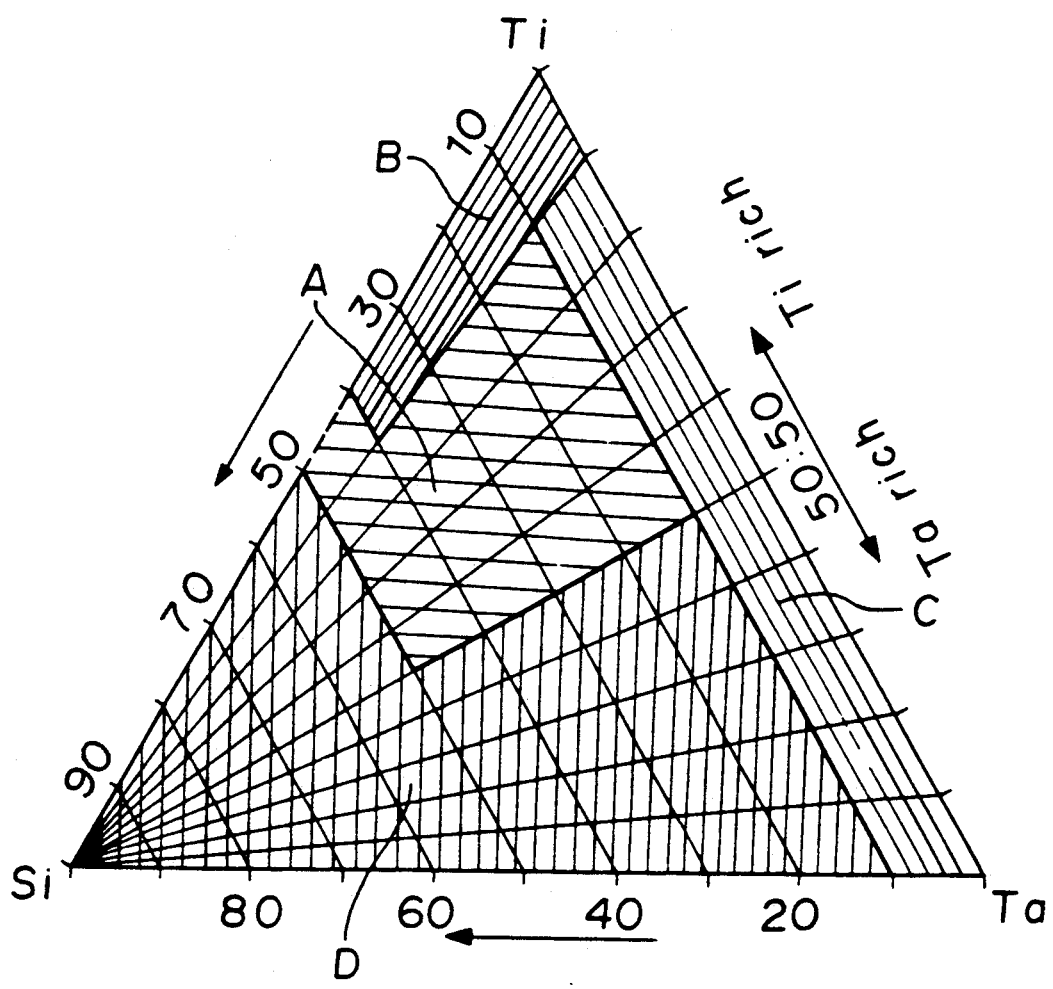
FIG. 4 is a compositional diagram showing the properties of the film in relation to the contents of the oxides of titanium (Ti), tantalum (Ta), and silicon (Si).

The reflective coating of high durability according to the present invention is the one composed of the composite oxide of Ti, Ta and Si as the principal component. The property of this reflective coating in relation to the composition of Ti, Ta and Si is shown in FIG. 4. In the drawing, the ratio of each and every component is indicated by a weight ratio with respect to the total oxide components of the oxide of Ti (converted in terms of $TiO_2$), the oxide of Ta (converted in terms of $Ta_2O_5$), and the oxide of Si (converted in terms of $SiO_2$). In the ensuing description, the contents of silicon oxide (converted in terms of $SiO_2$), titanium oxide (converted in terms of $TiO_2$), and tantalum oxide (converted in terms of $Ta_2O_5$) are respectively indicated by a, b and c (wt.%). In the compositional diagram of FIG. 4, the region where $0 < a < 40$ (wt.%) and b : c = 100 : 0–90 : 10 (the portion indicated by B in FIG. 4) is inferior in its chemicals-resistant property, particularly acid-resistant property. Further, the region where $0 < a < 10$ (wt.%) and b : c = 90 : 10–0 : 100 (the portion indicated by C in FIG. 4) is inferior in durability against stain with oils and fats, i.e., anti-fouling property.

In order for such reflective coating of high durability according to the present invention to exhibit its function as the reflective coating as mentioned above, it should preferably have a higher refractive index than glass. In particular, as the combiner for head-up display, the coating should preferably have its refractive index of 1.8 or higher. The reason for this is that, when its refractive index is below 1.8, favorable reflectance, as the combiner for head-up display, is difficult to be obtained, even if the film thickness is increased. The refractive indices of the constituent elements of the reflective coating according to the present invention are: approx. 2.2 to 2.3 for $TiO_2$, approx. 2.1 to 2.0 for $Ta_2O_5$, and approx. 1.5 for $SiO_2$. On account of this, when the silicon oxide and the tantalum oxide are in large contents, the resulted film tends to show a relatively low refractive index. In other words, the region where $a > 50$ (wt.%), and the region where $10 < a < 50$ (wt.%) and b : c = 50 : 50–0 : 100 (the portion indicated by D in FIG. 4) has a low refractive index, hence these compositional regions are not suitable as the reflective coating.

From the foregoing observations, it may be concluded that the most favorable region in the compositional diagram of FIG. 4 for the purpose of the reflective coating of high durability according to the present invention should preferably be the portion indicated by A, that is to say:
 (i) the region where $10 \leq a \leq 40$, and b : c = 90 : 10 –50 : 50; or
 (ii) the region where $40 \leq a \leq 50$, and b : c = 100 : 0–50 : 50 (provided that compositional ratio of b : c = 100 : 0 is excluded) (the white portion in FIG. 1); in particular, the composition satisfying a relationship of $20 \leq a \leq 50$, and b : c = 90 : 10-50 : 50 is the most preferable.

The reflective coating of the present invention may contain therein phosphorus (P) for the purpose of improving its sintering property, when it is sintered after its application onto the substrate by the screen-printing, etc., or improving its wear-resistant property.

In the reflective coating composed of the composite oxides of Si, Ti and Ta, and having high durability, according to the present invention, the tantalum oxide is considered to have its principal role of increasing durability against acid, alkali, and other chemicals, while the silicon oxide is considered to have its principal role of improving smoothness of the film with the consequent increase in durability against stain due to organic acids, oils, and so forth.

There is no particular limitation to the process for manufacturing the reflective coating of high durability, and any conventional methods may be used arbitrarily, such as the vacuum-evaporation method, the sputtering method, the ion-plating method, and other vacuum film-forming methods. Besides these, the sol-gel methods such as the immersing method, the printing method, etc. can also be used. Of various methods, the one, in which an ink containing therein metal alkoxide as the material to be turned into a metal oxide is applied onto the substrate by the screen-printing, followed by baking the formed film, brings the highest productivity and is of a low manufacturing cost, hence it is preferable.

Thus, with a view to securing stability in printing as well as time-lapse, when the screen-printing method is utilized, it is desirable to use an ink prepared by dissolving alkoxide into a high boiling point solvent such as a mixture of octanol and phenyl cellosolve, and thickened with ethyl cellulose.

As the windshield glass 2 for use with the combiner 3 for head-up display according to the present invention, there may usually be employed, from the standpoint of safety, a laminated glass manufactured by joining two sheets of glass with interposition of an intermediate plastic film between them. It should, however, be noted that the present invention is not limited to this type of laminated glass, but a single sheet of glass plate may of course be used.

The reflective coating of high durability, which is made up of the above-mentioned composite oxide of Ti, Si and Ta, can be used not only as the combiner for head-up display, but also as the highly durable reflective coating to be provided on the glass plate which has various uses in the fields of automobile, architecture, electronic parts, and others.

With a view to enabling those persons skilled in the art to put the present invention into practice, the following preferred examples will be presented.

EXAMPLE 1

A reflective coating 1 comprising $TiO_2$-$SiO_2$ as the main component was formed by screen-printing on a clear glass plate having a thickness of 2 mm. After baking, the resultant oxide coating had an optical film thickness of 804 Å (refractive index n=2.01, the actual film thickness=400 Å), and had a neutral color.

The resultant glass plate and a bronze glass plate having a thickness of 2 mm were made into a laminated glass with a PVB (polyvinyl butyral) film of 30 mil interposed between the two glass plate in such a manner as to have the reflective coating 1 exposed outside, thus producing a head-up display (HUD) combiner. The part of the resultant combiner where the reflective coating 1 was formed, had a visible light transmittance Tv of 72%, and the reflective coating had a visible light reflectance Rv (incident angle=0°) of 14.5%.

The surface of the non-coated part of the glass plate having the reflective coating 1 of the combiner, had a visible light transmittance Tv of 82.5%, and the surface of the same part of the same glass plate had a Rv of 8.5%. The reflection properties of the reflective coating (1) part of the combiner at incident angles of 60°, 65° and 70° are shown in FIG. 2. The reflectance of the light of 505 nm at the incident angle of 65° was about 25%.

EXAMPLE 2

A reflective coating 1 comprising $TiO_2$-$SiO_2$ as the main component was formed by screen-printing on a clear glass plate having a thickness of 2 mm. After baking, the resultant oxide coating had an optical film thickness of 850.5 Å (refractive index n=1.89, the actual film thickness=450 Å), and had a neutral color.

The resultant glass plate and a bronze glass plate having a thickness of 2 mm were made into a laminated glass with a PVB (polyvinyl butyral) film of 30 mil interposed between the two glass plate in such a manner as to have the reflective coating 1 exposed outside, thus producing a head-up display (HUD) combiner. The part of the resultant combiner where the reflective coating 1 was formed, had a visible light transmittance Tv of 75%, and the reflective coating had a visible light reflectance Rv (incident angle=0°) of 10.2%.

The surface of the non-coated part of the glass plate having the reflective coating 1 of the combiner, had a visible light transmittance Tv of 82.5%, and the surface of the same part of the same glass plate had a Rv of 8.5%. The reflection properties of the reflective coating (1) part of the combiner at the incident angle of 65° are shown in FIG. 3. The reflectance of the light of 505 nm at the incident angle of 65° was about 21%.

The reflective coating of the HUD combiner thus obtained by this process had a neutral color and no sense of incompatibility, which does not impair the design of an automobile.

EXAMPLE 3

A reflective coating 1 comprising $TiO_2$-$SiO_2$ as the main component was formed by screen-printing on a clear glass plate having a thickness of 2 mm. After baking, the resultant oxide coating had an optical film thickness of 700 Å (refractive index n=2.0, the actual film thickness=350 Å), and had a neutral color.

The resultant glass plate and a bronze glass plate having a thickness of 2 mm were made into a laminated glass with a PVB (polyvinyl butyral) film of 30 mil interposed between the two glass plate in such a manner as to have the reflective coating 1 exposed outside, thus producing a head-up display (HUD) combiner.

FIG. 5 indicates the characteristics of transmittance through the portion of the reflective coating 1 as well as reflection (incident angle of 0 degree) at the surface of the functional thin film at the inner side of a car, when the one side of the combiner, on which the functional coating had been formed, was made the inner side of the car.

FIG. 6 shows the reflection characteristics of the reflective coating 1 at the inner side of the car with the incident angle of 65 degrees at the portion of the reflective coating. The HUD combiner as formed had a favorable outer appearance, which was free from haze and optical distortion.

The reflective coating of the HUD combiner thus obtained by this process had a neutral color and no sense of incompatibility, which does not impair the design of an automobile.

EXAMPLE 4

A clear soda-lime glass plate of 2 mm thickness polished with cerium oxide, washed with water and fully dried, was printed by screen-printing with a screen-printing ink containing alkoxides of Ti and Ta at the weight ratio of 50:50 (converted in terms of the oxide). The ink contained metal alkoxides in an amount of 2.0% by weight (converted in terms of the metal oxides), and had a viscosity of 3,600 cps. After baking the thus printed glass plate at 600° C. for 10 minutes, a transparent oxide film having a thickness of 500 Å and a refractive index of 1.89 ($\lambda=6328$ Å) was formed on the glass plate. The visible light transmittance (Tv) was 83% and the visible light reflectance (Rv) was 15%.

EXAMPLE 5

A clear soda-lime glass plate of 2 mm thickness fully washed was printed by screen-printing with an ink containing alkoxides of Ti, Ta and Si respectively in amounts of 49%, 21% and 30% (converted in terms of the oxide). The ink contained metal alkoxides in an amount of 2.0% by weight (converted in terms of the metal oxides), and had a viscosity of 4300 cps. The oxide film obtained after baking at 600° C for 10 minutes had a thickness of 500 Å, a refractive index of 1.92, Tv of 81% and Rv of 17%.

EXAMPLE 6

A clear soda-lime glass plate of 2 mm thickness fully washed was printed by screen-printing with an ink containing alkoxides of Ti, Ta and Si respectively in amounts of 42%, 18% and 40% (converted in terms of the oxide). The ink contained metal alkoxides in an amount of 2.0% by weight (converted in terms of the metal oxides), and had a viscosity of 4100 cps. The oxide film obtained after baking at 600° C. for 10 minutes had a thickness of 500 Å, a refractive index of 1.90, Tv of 82% and Rv of 16%.

EXAMPLE 7

A clear soda-lime glass plate of 2 mm thickness fully washed was printed by screen-printing with an ink containing alkoxides of Ti, Ta and Si respectively in amounts of 46%, 42% and 11% (converted in terms of the oxide). The ink contained metal alkoxides in an amount of 1.8% by weight (converted in terms of the metal oxides), and had a viscosity of 5200 cps. The oxide film obtained after baking at 600° C. for 10 minutes had a thickness of 500 Å, a refractive index of 1.89, Tv of 83.3% and Rv of 14.8%.

EXAMPLE 8

A clear soda-lime glass plate of 2 mm thickness fully washed was printed by screen-printing with an ink containing alkoxides of Ti, Ta and Si respectively in amounts of 40%, 36% and 24% (converted in terms of the oxide). The ink contained metal alkoxides in an amount of 2.0% by weight (converted in terms of the metal oxides), and had a viscosity of 5340 cps. The oxide film obtained after baking at 600° C. for 10 minutes had a thickness of 600 Å, a refractive index of 1.88, Tv of 82% and Rv of 16%.

EXAMPLE 9

A clear soda-lime glass plate of 2 mm thickness fully washed was printed by screen-printing with an ink containing alkoxides of Ti and Si respectively in amounts of 90% and 10% (converted in terms of the oxide). The ink contained metal alkoxides in an amount of 1% by weight (converted in terms of the metal oxides), and had a viscosity of 3800 cps. The oxide film obtained after baking at 600° C. for 10 minutes had a thickness of 350 Å, a refractive index of 2.0, Tv of 81% and Rv of 17%.

Six samples of the above Examples 4 to 9 were subjected to an acid-resistance test (dipped in 0.1N $H_2SO_4$ at room temperature for 10 days), an alkali-resistance test (dipped in 0.1N NaOH at room temperature for 10 days) and a fat-resistance test (dipped in a mixture of an organic acid and an organic material for one day) to measure the changes in visible light transmittance Tv before and after testing, thereby evaluating durability. As can be seen from the following Table 1, it was recognized that samples containing the specific amounts of Ti oxide, Ta oxide and Si oxide had particularly satisfactory durability.

In Examples 1 to 9, the refractive index values were measured at $\lambda=6328$ Å by an ellipsometer. The Tv and Rv values in Examples 3 to 8 are respectively visible light transmittance and visible light reflectance as defined in JIS R-3106.

TABLE 1

| | Acid-resistance test | Alkali-resistance test | Fat-resistance test | Evaluation |
|---|---|---|---|---|
| Example 4 | No change | No change | Tv value 3–4% lowered | Δ |
| Example 5 | No change | No change | Tv value 1% lowered | ○ |
| Example 6 | No change | No change | No change | ◉ |
| Example 7 | No change | No change | Tv value 1–2% lowered | ○ |
| Example 8 | No change | No change | No change | ◉ |
| Example 9 | Tv value 2–3% raised | No change | Tv value 2–3% lowered | Δ |

*In the above Table, "no change" means that the change width of Tv value is within 1% before and after testing.

Each sample of Examples 4 to 9 was subjected to Taber abrading test (CS-10F abrading wheel, 500 g load, 1000 revolutions), but all the samples were substantially satisfactory since Tv and haze value changes were within 2%.

The present invention is capable of providing the combiner for head-up display which has substantially no difference in the color between the portion having the reflective coating and the portion having no such reflective coating, and has a neutral color in its outer appearance, hence no sense of incompatibility. Further, the reflective coating of the present invention has no reflection peak in a particular wavelength, which makes it possible to use the coating not only in the head-up display having a monochromatic light of blue, green, etc., but also in the head-up display having a light source containing various colors. A full-color display is also possible with this reflective coating.

Furthermore, the present invention is capable of providing the above-mentioned superior combiner for head-up display, which can be obtained with good productivity by simply forming a single layer of the metal oxide film.

Moreover, according to the present invention, there may be recognized the effect such that the reflective coating of excellent durability can be realized by the screen-printing method at a low manufacturing cost and with good productivity. In particular, by inclusion into the coating of the oxides of Ti, Ta and Si, each being at a predetermined ratio, the resulted film is capable of retaining its chemical durability comparable with the coating obtained by the vacuum evaporation.

By forming such reflective coating of high durability on the windshield glass, there can be provided the highly durable combiner for head-up display of sufficient practical utility.

I claim:

1. A combiner for head-up display comprising a combiner part which comprises a coating formed on a part of a surface of a windshield glass, said combiner part having a difference between a maximum reflectance and a minimum reflectance at the surface of said coating of not more than 5% in a wavelength range of 100 nm within the visible light region, said combiner part having a visible light reflectance, with an incident angle of approximately 0°, in a range of from 9 to 18% and a visible light transmittance of at least 70%, said coating being a composite oxide of Ti, Ta and Si.

2. The combiner for head-up display according to claim 1, characterized in that said reflective coating has a refractive index of from 1.8 to 2.3.

3. The combiner for head-up display according to claim 1, characterized in that said reflective coating has an optical film thickness of from 400 to 2,300 Å.

4. The combiner for head-up display according to claim 1, characterized in that said combiner part has a neutral color.

5. The combiner for head-up display according to claim 1 4, characterized in that said reflective coating has an optical film thickness of from 400 to 1,500 Å.

6. The combiner for head-up display according to claim 1, characterized in that said reflective coating has the following composition, provided that the contents of silicon oxide (converted in terms of $SiO_2$), titanium oxide (converted in terms of $TiO_2$), and tantalum oxide (converted in terms of $Ta_2O_5$) with respect to the total oxide components in the coating are respectively denoted by a, b and c (wt.%):

(i) a composition, where $10 \leq a \leq 40$, and b : c = 90 : 10 to 50 : 50; or (ii) a composition, where $40 \leq a \leq 50$, and b : c = 100 : 0 to 50 : 50 (the compositional ratio of b : c = 100 : 0 being excluded).

7. The combiner for head-up display according to claim 6, characterized in that said reflective coating has the composition of $20 \leq a \leq 50$, and b : c = 90 : 10 to 50 : 50.

8. A glass with reflective coating of excellent durability wherein at least a surface of said glass is covered with a reflective coating of a composite oxide of Ti, Ta, and Si.

9. The glass with reflective coating of excellent durability according to claim 8, characterized in that said reflective coating has the following composition, provided that the contents of silicon oxide (converted in terms of $SiO_2$), titanium oxide (converted in terms of $TiO_2$), and tantalum oxide (converted in terms of $Ta_2O_5$) with respect to the total oxide components in the coating are respectively denoted by a, b and c (wt.%):

(i) a composition, where $10 \leq a \leq 40$, and b : c = 90 : 10 to 50 : 50; or (ii) a composition, where $40 \leq a \leq 50$, and b : c = 100 : 0 to 50 : 50 (the compositional ratio of b : c = 100 : 0 being excluded).

10. The glass with reflective coating of excellent durability according to claim 9, characterized in that said reflective coating has the composition of $20 \leq a \leq 50$, and b : c = 90 : 10 to 50 : 50.

* * * * *